June 15, 1954 R. E. SPENCER 2,681,181

REGISTER SUCH AS IS EMPLOYED IN DIGITAL COMPUTING APPARATUS

Filed May 28, 1952

Inventor
ROLF EDMUND SPENCER
By Ralph E. Atherton
Attorney

Patented June 15, 1954

2,681,181

UNITED STATES PATENT OFFICE 2,681,181

REGISTER SUCH AS IS EMPLOYED IN DIGITAL COMPUTING APPARATUS

Rolf Edmund Spencer, West Ealing, London, England, assignor to Electric & Musical Industries Limited, Hayes, England, a British company Application May 28, 1952, Serial No. 290,428

Claims priority, application Great Britain June 5, 1951

4 Claims. (Cl. 235—61)

Figure 1:
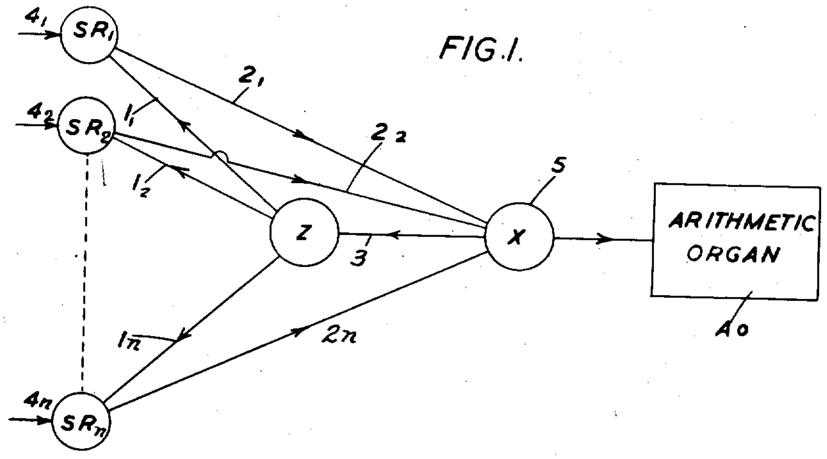

This invention relates to registers such as are employed in digital computing apparatus.

It has been proposed hitherto to employ shifting registers in digital computing apparatus composed of a cascade of coupled magnetic cores, such registers making use of the properties of the hysteresis loop for the material of the cores. The use of shifting registers for temporary storage implies operation of the computing apparatus in the time-serial mode, and for operation in this mode registers composed of magnetic cores have the disadvantage that the shift speed is limited by the tendency for eddy current losses to occur and the maximum possible speed may be too low for some applications of digital computors. There is the additional disadvantage with shifting registers that at least two magnetic cores are required for each digit.

These disadvantages can be avoided, while retaining the advantages of magnetic core registers, by arranging the computor to operate in the parallel mode since in that case all the cores of the register would be cleared simultaneously and the time of clearance would only be one digit time. Moreover, only a single core for each digit is required in a particular register. However, other difficulties are associated with the employment of magnetic core registers in computors operating in the parallel mode. In most digital computing apparatus a plurality of sub-registers are associated with a common register. If the instruction for the machine is to "read" the contents of a particular sub-register, this is effected by transferring information stored in that sub-register to the common register, the transfer automatically clearing the sub-register. Such an operation can be easily performed if magnetic core registers are employed since the information stored in a sub-register can be transferred to the common register by pulsing all the cores of the sub-register simultaneously by means of a suitable advancing pulse after the fashion in which advancing pulses are used in magnetic core shifting registers. However, difficulty is encountered if it is necessary to carry out the instruction "read and retain" since this involves returning information from the common register to the original sub-register. Such an operation could be performed if a series of gates were interposed between the common register and each sub-register. In that case, transfer from the common register to a particular sub-register would involve pulsing the common register and simultaneously opening the gates leading to the selected sub-register, the other gates remaining closed. This proposal, however, would involve considerable complication in the equipment.

Similar difficulty may be encountered in other forms of digital computing apparatus where the transfer of information from one register or register unit to another is required, and the main object of the present invention is to reduce said difficulty.

Another object of the present invention is to provide electrical computing apparatus comprising a first two-state device and a second two-state device wherein the state of the first device can be transferred to the second device by a pulse applied only to the second device.

Another object of the present invention is to provide electrical computing apparatus comprising a first bank of magnetizable cores constituting a first number register and a second bank of magnetizable cores constituting a second number register wherein the state of the cores in the first bank can be transferred to the cores in the second bank by a pulse applied only to said second bank so that a number in the first register can be transferred to the second register.

Figure 2:
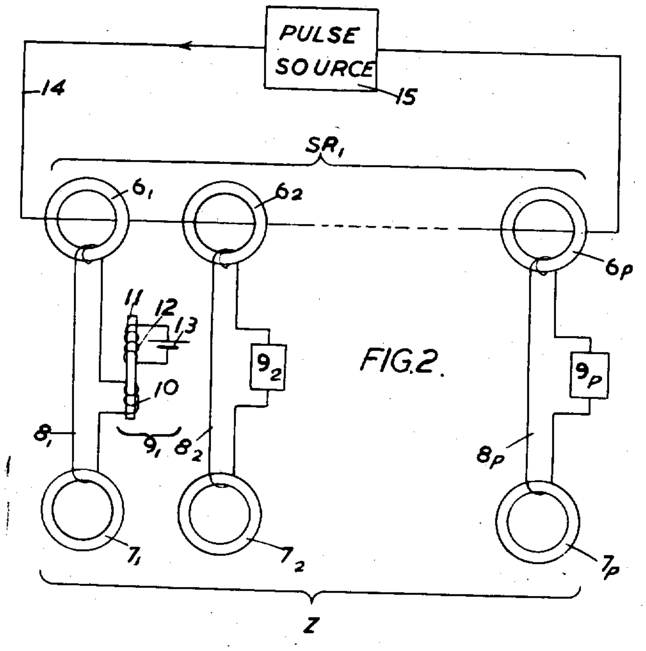

In order that the said invention may be clearly understood and readily carried into effect, the same will now be more fully described; with reference to the accompanying drawings, in which:

Figure 1 illustrates diagrammatically a register arrangement for a digital computor operating in the parallel mode and embodying one example of the present invention, and Figure 2 is a diagrammatic detail view of part of Figure 1.

Referring to the drawing, the computing apparatus comprises $n$ sub-registers $SR_1$ to $SR_n$ associated with a common register Z provided to act as a source from which information may be transferred as required to one or other of the sub-registers. The transfer couplings between the sub-register and the common register Z are denoted by the lines $1_1$ to $1_n$. A second common register X is provided arranged to act as a destination for information from the sub-registers $SR_1$ to $SR_n$ when a transfer from one of these registers is required, that is to say when the machine has to carry out the instruction "read and clear," the common register X being coupled with the arithmetic organ $A_0$ of the computing apparatus for the transfer of information thereto. The transfer couplings between the sub-registers SR and the common register X are denoted by the lines $2_1$ to $2_n$. If the machine receives an instruction to "read and retain," the appropriate sub-register SR is cleared into the common register X, and the transferred information is utilised by the apparatus as required and also transferred from the common register X via a coupling denoted by the reference 3 to the common register Z whence it is transferred back to the original sub-register. As will hereinafter appear the transfer of information from a selected sub-register SR to the common register X can be effected by applying a pulse of one polarity, termed an advancing pulse, to the selected sub-register, whilst the transfer of information from the common register Z to a selected sub-register can be effected by applying a pulse of opposite polarity, termed a "suck" pulse, to the selected sub-register. Leads for the application of advancing and suck pulses are denoted by the references $4_1$ to $4_n$. With such an arrangement the instruction "write" can also be performed merely by transfer of information to one of the sub-registers from the common register X via the common register Z. A transfer of information from the register X to the register Z can be effected in any desired manner, for example by applying an advancing pulse in known manner to the register X via a lead 5. Two common registers X and Z are employed since, in the absence of X, information to be transferred from one of the sub-registers $SR_1$ to $SR_n$ to the arithmetic organ would need to be routed via the register Z and in order to effect a transfer from Z to the arithmetic organ by means of an advancing pulse applied to Z. Gates would be necessary in each of the couplings $1_1$ to $1_n$ otherwise the advancing pulse would tend to disturb all the sub-registers by virtue of the sense of the couplings $1_1$ to $1_n$. The advantage to be derived by effecting a transfer from Z to any of the sub-registers by means of a suck-pulse would thus be lost.

The construction of one of the sub-registers $SR_1$ and of the common register Z is illustrated in Figure 2, and it will be understood that the other sub-registers SR are of the same construction and are similarly coupled to the common register Z. It will be assumed that the computing apparatus employs a word length of $p$ digits, and sub-registers $SR_1$ comprises a bank of $p$ magnetic cores $6_1$ to $6_p$, one for each digit, the common register Z likewise comprising $p$ magnetic cores $7_1$ to $7_p$. The cores may be toroids of small diameter and the apparatus makes use of the properties of the hysteresis loop of the magnetic cores to represent the binary digit values "0" and "1," in the manner described in an article entitled "Static Magnetic Storage and Delay Line" by Wang and Woo published in volume 21 of the Journal of Applied Physics, at page 491 et seq. Thus, remanence magnetisation of one polarity has assigned to it the digit value "1" and remanence magnetisation of the opposite polarity has assigned to it the digit value "0." The cores of the sub-register are coupled, by means of links $8_1$ to $8_p$ each of which includes a unidirectionally conductive device $9_1$ to $9_p$, to the corresponding cores of the common register Z. The unidirectionally conductive devices are employed for the purpose of preventing undesirable transfer of information from one core to another. One suitable form of unidirectionally conductive device is illustrated in the case of the link 8, and as shown it comprises a choke 10 which has a magnetic core 11 to which is applied a biasing winding supplied with direct current from a source 13 indicated conventionally as a battery. The current is such as to saturate the core with magnetisation of one polarity whereby for current in one direction in the link 8 the choke 10 has a low impedance whilst for current in the other direction it has a high impedance. The cores $6_1$ to $6_p$ are, moreover, "laced" together by means of a single winding connected to a source of pulses 15 so that current pulses may be applied simultaneously to all the cores of the sub-register $SR_1$.

Such a current pulse is applied to the cores $6_1$ to $6_p$ if it is required to transfer information from the common register Z to the sub-register $SR_1$. It will be assumed that before such a transfer is effected, the sub-register $SR_1$ has been cleared, so that when the current pulse is applied, all the cores of the sub-register are in the state "0." The sense of the current pulse is moreover such as to tend to reverse the state of magnetisation of all these cores so as to bring them to state "1." If a particular core of the sub-register $SR_1$ is linked to a core in the common register Z which is in state "1," the E. M. F. induced in the linkage between that sub-register core and the corresponding common register core, has a sense tending to change the common register core from state "1" to state "0." Such a change in the core of the common register carries the core from one saturated state of magnetisation through an unsaturated state to another saturated state and therefore the turns of the winding on the common register core operate with a high inductance and present a high impedance to the source of the current pulse applied to the sub-register. In this condition sufficient energy is applied to the core of the sub-register $SR_1$ to change its state of magnetisation from state "0" to state "1" as required. If, however, the core of the common register is in state "0" the E. M. F. induced in the link to the corresponding sub-register core is of a sense tending to maintain the common register core in state "0." That is to say, the core is maintained in its saturated condition and is presents an effective short circuit to the source of the current pulse applied to the sub-register $SR_1$ and insufficient energy is applied to the sub-register core to cause a change in the state of magnetisation thereof so that it remains in state "0." The effect is therefore that the current pulse applied to the cores of the sub-register $SR_1$ "sucks" the information from the common register Z into the sub-register and at the same time clears the common cores. The other sub-registers coupled to the core Z are unaffected by the transfer by virtue of the unidirectionally conductive nature of the links between the sub-registers and the common register Z. It is however important, in order to achieve satisfactory operation, that the impedance of each link in the conductive direction should be low. It will be appreciated that the polarity of the "suck" pulse is opposite to the polarity of the advancing pulses which are used in magnetic core shifting registers such as described in the aforesaid publication. Therefore it is possible to transfer information from any sub-register $SR_1$ to the common register X merely by applying thereto advancing pulses in known manner, such advancing pulses having no effect on the links such as $8_1$ to $8_p$ by reason of the unilaterally conductive nature thereof.

What I claim is:

1. In electrical computing apparatus, a first bank of two-state devices, a second bank of two state devices, one corresponding to each device in the first bank, means for applying pulses t the devices in said second bank predetermined to change each of said latter devices from a single one of its states to its other state, and means effective in a single state of the corresponding device in said first bank for inhibiting said change, whereby the state of the devices in said first bank can be transferred to the devices in said second bank by a pulse applied only to said latter devices.

2. In electrical computing apparatus, means for transferring a number-representation from one register to a second register comprising a first bank of magnetizable cores constituting said first register, a second bank of magnetizable cores constituting said second register, one core in the second bank corresponding to each core in the first bank, means for applying a pulse to each core of said second bank predetermined to change each core from a state of saturation with magnetization of one polarity to a state of saturation with magnetization of the opposite polarity, and a coupling from each core in the first bank to the corresponding core in the second bank, each coupling being responsive to saturated magnetization of a single polarity in the core in the first bank to inhibit said change in the corresponding core in the second bank, whereby the state of the cores in the first bank can be transferred to the cores in the second bank by a pulse applied only to said second bank.

3. In electrical computing apparatus, means for transferring a number-representation from a common register to a selected one of a plurality of subregisters, comprising a first bank of magnetizable cores constituting said common register, a plurality of further banks of magnetizable cores, each further bank constituting one of said subregisters, one core in each further bank corresponding to each core in the first bank, means for applying a pulse simultaneously to each core in a selected one of said further banks with said pulse predetermined to change each core in the selected bank from a state of saturation with magnetization of one polarity to a state of saturation with magnetization of opposite polarity, and unidirectional conductors linking each core in the first bank to the corresponding cores in the further banks, each conductor being responsive to saturated magnetization of a single polarity in the core in said first bank to inhibit said change in the corresponding core in the selected bank, and the conducting direction of said linkages being predetermined to prevent coupling between said further banks via said first bank.

4. Means according to claim 3, comprising another bank of magnetizable cores constituting another common register, means for transferring a number-representation selectively from said subregisters to said other common register, and means for transferring a number-representation from said other common register to said first common register.

References Cited in the file of this patent

UNITED STATES PATENTS

| Number | Name | Date |
|---|---|---|
| 2,591,931 | Grosdoff | Apr. 8, 1952 |

OTHER REFERENCES

"Magnetic Cores as Elements of Digital Computing Systems," Haynes; Thesis submitted in Graduate College of the University of Illinois, December 28, 1950; pages 24, 25, 29, 30, 33–36.